United States Patent Office 3,654,363
Patented Apr. 4, 1972

3,654,363
PROCESS OF MONO- AND DI-NITRATING
p-PHENYLENE DIAMINE COMPOUNDS
Franz J. Pum, Stamford, Conn., and Richard W. Schnetzinger, New Rochelle, N.Y., assignors to Revlon, Inc.
No Drawing. Filed Oct. 9, 1969, Ser. No. 865,190
Int. Cl. C07c 87/54
U.S. Cl. 260—577
6 Claims

ABSTRACT OF THE DISCLOSURE 2-nitro- and 2,6-dinitro-$N_1,N_4$-dialkyl - p - phenylenediamines are obtained by nitrating an $N_1,N_4$-diacyl-$N_1,N_4$-dialkyl-p-phenylenediamine with a mixture of sulfuric acid and fuming nitric acid at about 35–80° C. (preferably 47–52° C.) and removing the acyl groups by treatment with alcoholic HCl. These compounds are useful intermediates in the preparation $N_1,N_4$-trisubstituted nitro or dinitro-p-phenylenediamines which are useful hair dyes.

This invention relates to a process of nitration. It particularly relates to an improved process for preparing 2-nitro-$N_1,N_4$-dialkyl- and 2,6-dinitro - $N_1,N_4$ - dialkyl-p-phenylenediamines. It further relates to the compound 2,6-dinitro-$N_1,N_4$-dimethyl - p - phenylenediamine which is a particularly useful intermediate in the preparation of 2,6-dinitro-p-phenylenediamines of the structure

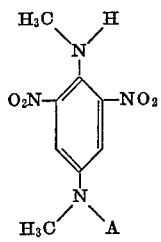

wherein A is a lower alkyl or hydroxy-lower alkyl, which diamines are particularly useful as hair dyes. These diamines are described in our copending application Ser. No. 865,202, filed Oct. 9, 1969, now abandoned, which copending application was filed concurrently with the present application.

The nitration of p-phenylenediamines to form mononitro-p-phenylenediamines is well known. Examples of such nitrations are described in U.S. Pats. Nos. 3,117,911 and 3,168,442, British Pat. No. 1,061,515 and the J. Chem. Soc. 1967, 1136. The procedures described in thse publications yield only the mononitro derivative and at best are time consuming, involving several steps. Furthermore, it is extremely difficult to further nitrate the mononitro to a dinitro derivative.

It is, accordingly, an object of this invention to provide a process for the preparation of 2-nitro- and 2,6-dinitro derivatives of p-phenylenediamines, which process may be carried out with a minimum number of steps.

It is a further object to provide a process whereby these nitro derivatives are obtained in good yield and in an essentially pure state.

In accordance with this invention, we provide a process for preparing 2-nitro-$N_1,N_4$-dialkyl- and 2,6-dinitro-$N_1,N_4$-dialkyl-p-phenylenediamines of the structures

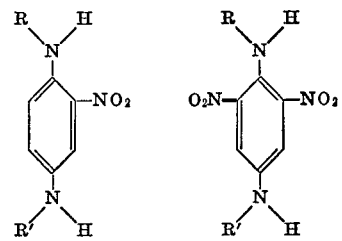

wherein R and R' are lower alkyl groups and may be the same or different. This process is a two-step process comprising the nitration of p-phenylenediamines of the structure

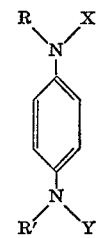

wherein R and R' are the same as above and X and Y are acyl or aromatic or aliphatic sulfonyl groups which may be the same or different, and treatment of the resulting nitrated derivative with a mineral acid. It is believed that the reaction proceeds as follows:

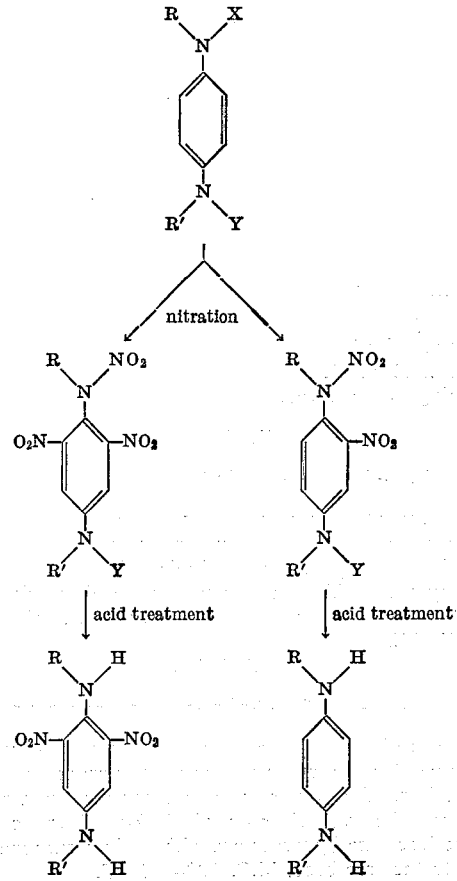

It will be noted that the nitration results in the formation of both the dinitro and mononitro derivatives, and these are separated prior to the acid treatment.

In carrying out the nitration, we use a mixture of concentrated nitric acid and concentrated sulfuric acid. Preferably, we use fuming nitric acid. Desirably, the fuming nitric acid contains 90% $HNO_3$. The mixture of acids is prepared to contain the acids in approximately 1:1 ratio by volume. The nitration may be carried out at temperatures ranging from about 35–80° C., but preferably the reaction is carried out in the somewhat narrower temperature range of about 47–52° C.

Upon completion of the nitration, the ring dinitrated compound is separated from the ring mononitrated compound and purified by digesting the mixture is a hot alkanol, preferably methanol. The dinitro compound remains as a purified precipitate, while the mononitro compound is recovered from the mother liquor. Each of the isolated compounds is then treated with hydrogen chloride in an anhydrous alkanol, preferably ethanol, to remove the remaining acyl group and the nitro group on the amine nitrogen in the 1-position. Preferably, the nitro group attached to the amino nitrogen may first be removed by treatment with phenol at about 180 to 190° C. for about a half hour, and then the acyl or sulfonyl group removed by treatment with hydrogen chloride.

While any $N_1$, $N_4$-diacylated or (di sulfonyl)-$N_1$, $N_4$-dialkyl-p-phenylenediamine may be readily nitrated by the above procedure, we prefer to use the $N_1$, $N_4$-diacetyl derivatives. When the alkyl groups are both methyl we obtain 2,6 - dinitro - $N_1$, $N_4$-dimethyl-p-phenylenediamine, which novel compound, as noted above, is a valuable intermediate in the preparation of useful hair dyes. In addition, this compound is itself a useful hair dye imparting a red-violet shade to the hair.

The invention will be more fully understood from the examples which follow, which examples are given by way of illustration and are not to be considered as limiting.

EXAMPLE I $N_1,N_4$-dimethyl-$N_1$,2,6-trinitro-$N_4$-acetyl-p-phenylenediamine 44 g. $N_1,N_4$-dimethyl-diacetyl-p-phenylenediamine was gradually added to a nitrating mixture consisting of 300 ml. 96% sulfuric acid and 320 ml. 90% nitric acid at room temperature. The temperature was then raised to 50°C. and maintained between 47–52° C. for one hour. The reaction mixture was then poured onto ice. The gummy yellow solid which formed was extracted with methylene chloride, washed with water and then with sodium bicarbonate solution until neutral. The dried organic layer was stripped leaving behind an oil which when digested with hot methanol yielded a bright yellow solid. Yield 23.2 g., M.P. 151–152° C. The mother liquor and washings were saved.

EXAMPLE II $N_1,N_4$-dimethyl-2,6-dinitro-p-phenylenediamine

The compound prepared in Example I was treated under reflux with anhydrous hydrogen chloride in ethanol for 2½ hours to yield an insoluble yellow hydrochloride. The hydrochloride when slurried with sodium bicarbonate solution yields the free base, a brown-black solid melting at 130–132° C.

EXAMPLE III $N_1,N_4$-dimethyl-2-nitro-p-phenylenediamine

The mother liquor and washings from the digestion in Example I were combined and evaporated to dryness. The oily residue was refluxed in ethanolic hydrogen chloride and the hydrochloride which formed was converted to the free base by treatment with sodium carbonate solution to the free base, M.P. 109–111° C.

EXAMPLE IV $N_1$-methyl-2,6-dinitro-$N_4$-acetyl-p-phenylenediamine 5 g. $N_1$-methyl-$N_1$-2,6-tri-nitro-$N_4$-acetyl-p-phenylenediamine and 10 g. phenol were heated at 180–190° C. for about ½ hour. The solution was cooled and poured into 120 ml. ethanol. A fine yellow precipitate formed which was filtered, washed with ethanol and dried. Yield 3.73 g. The acetyl group was removed by the treatment described in Example II to give the compound of Example II.

We claim:

1. A process for preparing compounds of the formula

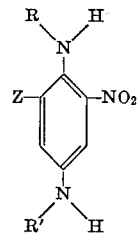

wherein Z is hydrogen or nitro, and R and R' are lower alkyl and may be the same or different consisting of the steps:

(a) treating in a mixture of concentrated sulfuric acid and fuming nitric acid at a temperature from about 35 to 80° C. a compound of the formula

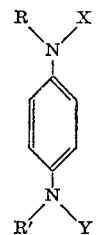

to form a compound of the formula

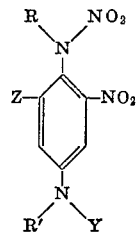

wherein R, R' and Z are the same as above and X and Y are acetyl;

(b) separating by digestion is an alkanol the compound wherein Z is hydrogen from the compound wherein Z is nitro; and (c) removing the acetyl and $N_1$-nitro groups.

2. A process according to claim 1 wherein R and R' are methyl.

3. A process according to claim 2 wherein the reactants are maintained at a temperature of from about 47 to 52° C. for about 1 hour.

4. A process according to claim 3 wherein the concentrated sulfuric acid and fuming nitric acid are present in the mixture in about a 1:1 ratio by volume.

5. A process according to claim 4 wherein the digestion is effected in hot methanol.

6. A process according to claim 4 wherein the $N_1$-nitro group is removed by heating the nitrated compound with phenol and the acetyl group is removed by treatment with hydrogen chloride.

References Cited

UNITED STATES PATENTS

| 2,750,326 | 6/1965 | Eckardt | 260—573 X |
| 2,652,331 | 9/1953 | Weissberger et al. | 260—577 X |
| 3,188,346 | 6/1965 | Kalopissis et al. | 260—577 |

OTHER REFERENCES

Mitsuhashi et al., Chemical Abstracts, vol. 62, 1965. 16393h.

JOSEPH REBOLD, Primary Examiner
C. F. WARREN, Assistant Examiner

U.S. Cl. X.R.

260—573, 645, 688